United States Patent [19]
Ho

[11] Patent Number: 5,774,862
[45] Date of Patent: Jun. 30, 1998

[54] COMPUTER COMMUNICATION SYSTEM

[76] Inventor: Kit-Fun Ho, P.O. Box 54504, North Point, Hong Kong

[21] Appl. No.: 887,666

[22] Filed: Jul. 3, 1997

Related U.S. Application Data

[63] Continuation of Ser. No. 433,245, May 2, 1995, abandoned, which is a continuation of Ser. No. 836,185, Feb. 13, 1992, abandoned, which is a continuation of Ser. No. 472,422, Jan. 30, 1990, which is a continuation of Ser. No. 622,210, Jun. 19, 1989.

[51] Int. Cl.$^6$ .............................. G10L 9/12; G10L 9/00
[52] U.S. Cl. ........................ 704/275; 704/213; 704/207
[58] Field of Search ................................. 704/200, 207, 704/270, 275, 276, 213; 84/616; 379/77, 97

[56] References Cited

U.S. PATENT DOCUMENTS

| | | | |
|---|---|---|---|
| 3,535,454 | 10/1970 | Miller | 704/207 |
| 3,647,973 | 3/1972 | James et al. | 379/97 |
| 4,230,012 | 10/1980 | Bommersbach et al. | 704/200 |
| 4,275,266 | 6/1981 | Lasar | 704/275 |
| 4,441,399 | 4/1984 | Wiggins et al. | 704/200 |
| 4,443,857 | 4/1984 | Albarello | 704/213 |

*Primary Examiner*—David D. Knepper
*Attorney, Agent, or Firm*—Thomas R. Vigil

[57] ABSTRACT

Musical intervals are used as codes to communicate preselected commands or inputs to a computer. The system can use human voice sounding notes (DO-RE, etc.) successively to establish the interval and can use electrical circuitry and programs for converting the received notes or tones into pulse trains of the same fundamental period and for storing and calculating the period and interval. When a particular interval is received the apparatus including a digital microcomputer such as the Apple II PLUS™ may execute a pre-set recorded subroutine and restore the circuitry for the reception of a second interval.

24 Claims, 8 Drawing Sheets

COMPUTER COMMUNICATION SYSTEM

This is continuation of application Ser. No. 08/433,245 filed May 2, 1995, abandoned, which is a continuation of U.S. Ser. No. 07/836,185 filed Feb. 13, 1992, abandoned, which is a continuation of U.S. Ser. No. 07/472,422 filed Jan. 3, 1990 which is a continuation of Ser. No. 06/622,210 filed Jun. 19, 1989.

BACKGROUND OF THE INVENTION

1. Field of the Invention

The present invention relates to communication to machines and is especially concerned with vocal communication of commands to a computer.

2. Description of the Prior Art

A great deal of interest in and research has been done on vocal communication by humans to computers. Advantages of, applications for, and common systems for vocal communication with computers were surveyed in an article entitled "Toss Your Keyboards and Just Tell Your Computer What to Do" by A. E. Conrad in the January 1984 issue of *Research & Development, Vol.* 26, No 1, pages 86–89.

As pointed out in this publication, most work in this field has been on speech recognition systems which are speaker-specific or speaker dependent and speaker independent systems. The former is able to recognize only words spoken by an individual while the latter may recognize the same word spoken by a number of individuals. The speaker-specific system can currently recognize (or be taught to recognize) a larger number of words than the speaker independent system and consequently can control more functions. Both systems rely on the creating of "templates" of spoken words and matching the received word to the templates.

A great deal of effort has been expended in this area and numerous patents and articles exist as evidenced by the survey of technical publications found in the Description of the Prior Art section of the Marley U.S. Pat. No. 4,284,846. This prior patent teaches one system for analyzing and comparing words by comparing certain waveform characteristics with pre-stored ratios.

Other patents disclosing speech recognition systems are: Sakoe, U.S. Pat. Nos. 4,286,115 and 4,319,221; B. H. An U.S. Pat. No. 4,292,470; Welch, et al U.S. Pat. Nos. 4,319,085 and 4,336,421; Kellett U.S. Pat. No. 4,343,969; Pirz U.S. Pat. No. 4,349,700; Taniguchi et al U.S. Pat. No. 4,389,109; Hitchock U.S. Pat. No. 4,388,495; Duifhuis et al U.S. Pat. No. 4,384,335; and Rothschild et al U.S. Pat. No. 4,399,732.

Such systems are quite complex and expensive or else extremely limited in their abilities. For example, a typical speaker independent system might recognize about 10 words (e.g. the ten digits) while a speaker-specific system can recognize perhaps an order of magnitude higher, of 100 to 200 words.

SUMMARY OF THE INVENTION

The present invention differs from the systems disclosed in the reference patents cited above by providing a relatively less complex system which takes advantage of the physical fact that the human voice can extend over a much wider range than is normally necessary to be used, or is normally used in speech, to economically achieve a speaker independent system that can recognize a larger number of different vocal commands. A system constructed in accordance with the teachings of the present invention senses and recognizes tonal differences which are treated as coded signals to perform preset defined functions.

The tonal differences are, in accordance with one feature of the present invention, tones in a musical scale such as the common diatonic scale and means are provided for setting the key for each different user by comparing different tones such as the user's subjective middle C tone and his/her D tone voiced subsequently. The system of the present invention employ and recognizes musical intervals as commands or inputs.

The system lends itself to many applications, including input into and control of a computer in an environment where it is not practical to use other types of input systems. As in dark rooms (for example, electronic microscope rooms) or where the user must employ his hands in other tasks, as in a production process. The system is of great utility to the disabled, especially those who may easily not operate conventional computer terminals.

The same recognition system of the present invention, together with the advantages thereof, may best be understood by reference to the following description taken in connection with the accompanying drawings, in the several figures of which, like reference numerals identify like elements.

DESCRIPTION OF THE PREFERRED EMBODIMENTS

The principles of the present invention are capable of being applied with hardware and/or with software in a variety of manners, several of which, with variations, will be described herein.

Figure 1:
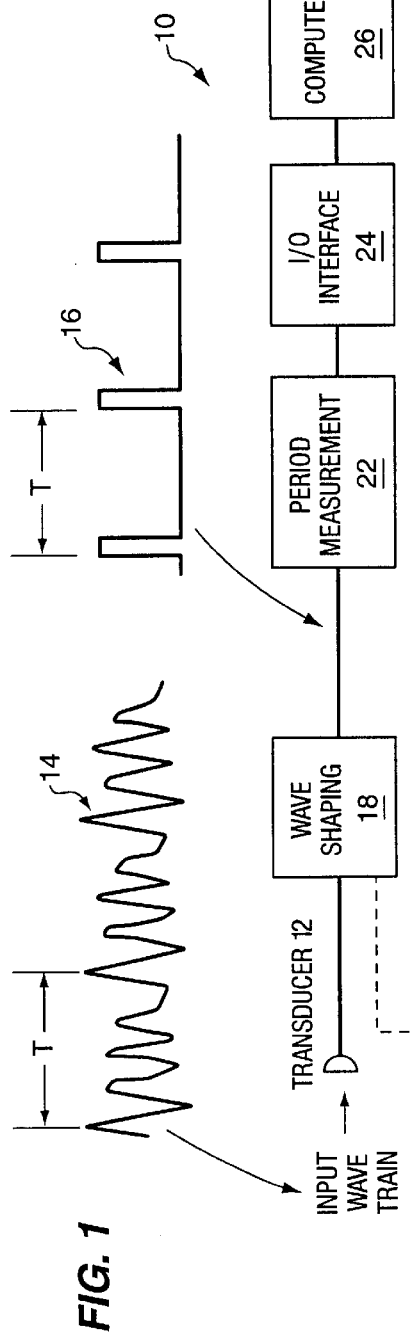
FIG. 1 is a block circuit diagram of a sound recognition system constructed in accordance with the teachings of the present invention with waveforms at various points indicated.

A system constructed in accordance with the present invention is shown in FIG. 1 and is generally identified therein by reference numeral 10. The system 10 includes a transducer 12 such as microphone, which serves to pick up sound waves such as depicted by waveform 14. Such waves, as in the case of a person singing the note "C", has a basic period "T" for a rate of that pitch. To simplify the electronics, the electric analog of the received sound waveform 14 is converted to a pulse wave train 16 having a period "T" by a wave shaping circuit 18.

As an alternative to the transducer 12, an auxiliary electric signal input 20 may be provided. This can be, for example, a telephone input for remote activation, or a tone generator.

The wave train 16 is received by a period measurement circuit 22 which measures and digitizes its period and feeds this information to an input/output interface 24 which interfaces with a digital computer 26.

In the overall operation of the system 10, the system 10 receives tonal signals at microphone 12 or input 20 and responds to selected ones of these to operate pre-programmed routines in the computer.

To understand the principles behind the operation of the system 10 of the invention, its application will be described with reference to the familiar diatonic scale, it being understood that it can be applied to other scales. The modern diatonic scale has intervals that are independent of the frequency of any particular tone (although once one frequency is set it determines the frequency of the remainder of the tones) and can be expressed in part by the following table:

|  |  | INTERVALS |
|---|---|---|
| ANY ARBITRARY | MI' | 2.5000 |
| DIATONIC SCALE | RE' | 2.2500 |
|  | DO' | 2.0000 |
|  | TI | 1.8750 |
|  | LA | 1.6667 |
|  | SO | 1.5000 |
|  | FA | 1.3333 |
|  | MI | 1.2500 |
|  | RE | 1.1250 |
| THE | DO | 1.0000 |
| REFERENCE | TI, | 0.93750 |
|  | LA, | 0.83333 |
|  | SO, | 0.75000 |
|  | FA, | 0.66667 |
|  | MI, | 0.62500 |
|  | RE, | 0.56250 |
|  | DO, | 0.50000 |
|  | TI, | 0.46875 |

Since most humans are familiar with this scale and even children can readily do a DO, RE, ME, FA, SO, LA, TI, DO (subconsciously choosing a reference frequency and relating it to the other tones by the above intervals) the present invention determines and reacts to intervals as its means of receiving information.

Figure 5:
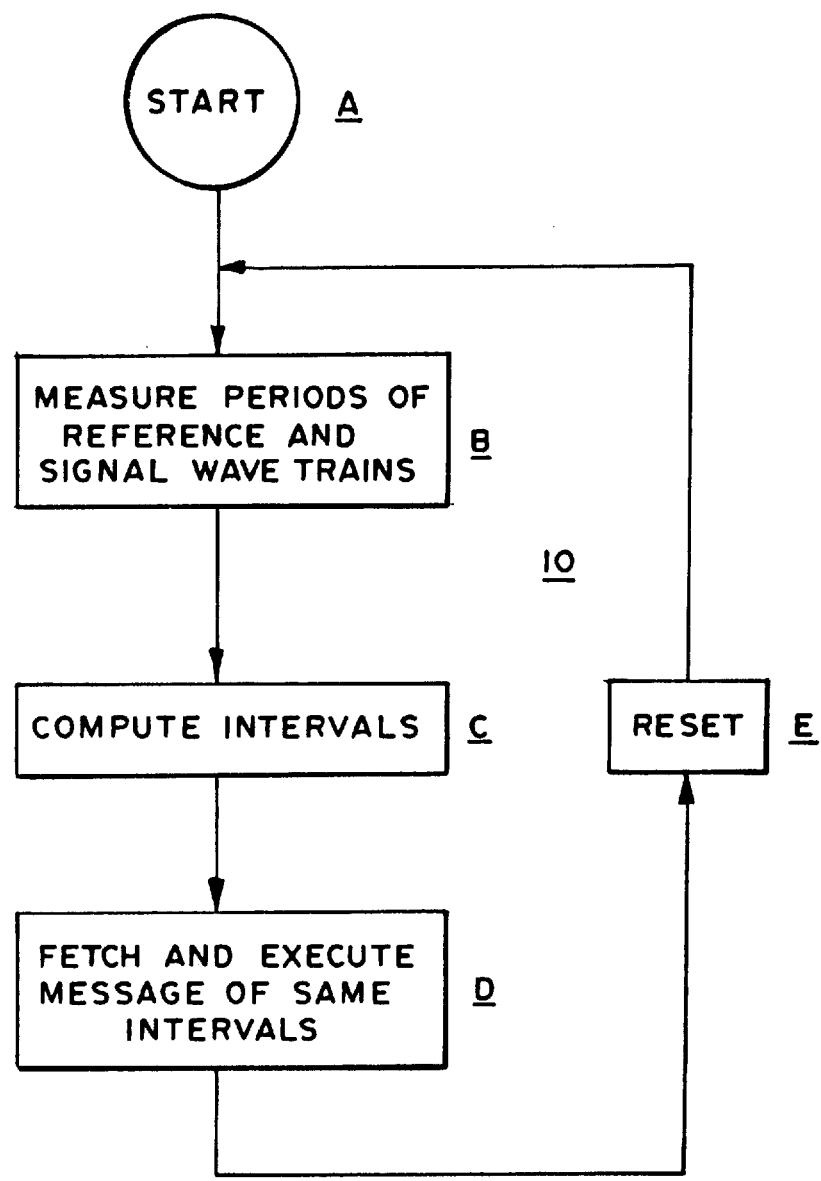
FIG. 5 is a flow chart useful in illustrating the overall operation of the system shown in FIGS. 1–3.

Thus, with reference to the flow chart of FIG. 5, a start command may be the reception of a detected tonal voice ("RE") at Stage A. This signal is measured to determine if it has a repeating period of sufficient duration (to avoid false activations) at Stage "B". If a reference signal exists (e.g. "DO") and is stored, the two are compared and if an interval of 1.125 is calculated at stage "C" a fetch and execute sub-routine is executed at Stage "D" recalling and executing a pre-recorded sub-routine for the interval 1.125. At the conclusion the system is reset at "E" and ready to receive a second signal (e.g. "FA") and respond to it in the same general manner.

To prevent the system from being speaker-specific, and allow its use by anyone with minimal musical ability, the reference signal is established by the same process. As a start up, the user need only sound "DO" into the microphone 12 for a short period of time and then sound "RE". The system treats the first tonal sound received as establishing the reference signal and the second one and subsequent ones as possible command signals.

Figure 2:
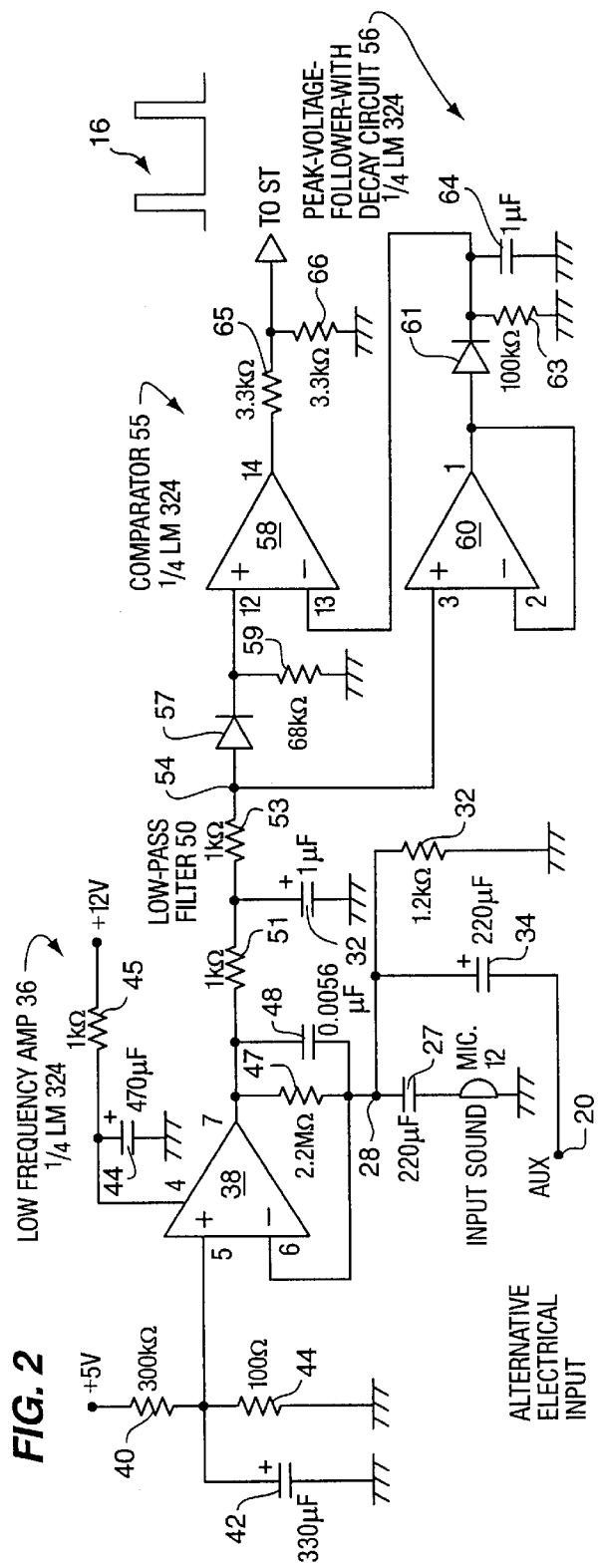
FIG. 2 is a circuit diagram of the wave shaping circuit portion of the system shown in FIG. 1.

A preferred embodiment for the wave shaping circuit 18 and its interconnection to the microphone 12 and auxiliary input 20 is shown in FIG. 2. Specific electrical values are given in FIG. 2 for the components employed, but of course many other values can be employed as is well known to those skilled in this art. However, the values and the connections of the circuit elements shown in FIG. 2 worked very well in a prototype.

More specifically, the microphone 12 was connected between chassis ground and a reactive impedance 27 to a circuit point 28. This point 28 was also connected through a resistor 32 to chassis ground and through a capacitor 34 to the auxiliary input 20.

Whichever signal input 12 or 20 receives a signal, that input 12 or 20 feeds it through to a low frequency amplifier 36 formed of an operational amplifier 38 whose negative input (pin 6) is connected to the point 28 and whose positive input (pin 5) is connected to bias voltage (plus 5 volts) through resistor 40 and to chassis ground through the parallel connection of capacitor 42 and resistor 44. The operational amplifier 38 has its pin 4 connected to a source of positive bias (12 volts) through a current limiting resistor 45 and to chassis ground through a capacitor 46. Some of the output of the operational amplifier 38 is fed back to its negative input via the parallel connection of a resistor 47 and capacitor 48.

The primary output of the amplifier 36 is fed to a low pass filter 50 consisting of a resistor 51, one side of which is connected to the output of the amplifier 36 and the other side of which is connected through a capacitor 52 to ground and through a resistor 53 to a circuit junction 54. The output of the low pass filter 50 is fed to junction 54 and from there to a comparator 55 and to a peak-voltage-follower-with-decay circuit 56. The signal is fed (a) through a current isolating diode 57 to the primary positive signal input (pin 12) of an operational amplifier 58 of comparator 55 which input is also connected to ground through a resistor 59 and (b) to the peak-voltage-follower-with-decay circuit 56. The output of the circuit 56 provides the primary negative signal input to an input pin (pin 13) of the comparator 55.

The circuit 56 is preferably formed by an operational amplifier 60 whose primary positive input (pin 3) is connected directly to junction 54 and whose output (pin 1) is fed back directly to its negative input (pin 2) and through an isolating diode 61 to the negative signal input of amplifier 58 with the output also being connected through a resistor 63 and capacitor 64 to ground. The resistor 63 and capacitor 64 in parallel have such a discharge time constant that at the comparator 55 the inverting input always has greater effect than the non-inverting input except for the most significant peak of each cycle of the signal appearing at junction 54.

The output, waveform 16, of the comparator 55 is taken from the junction of a pair of resistors 65 and 66 connected in series from the output (pin 14) of the operational amplifier 58 to ground. This output is fed to input, ST, of the period measurement circuit 22.

Figure 3:
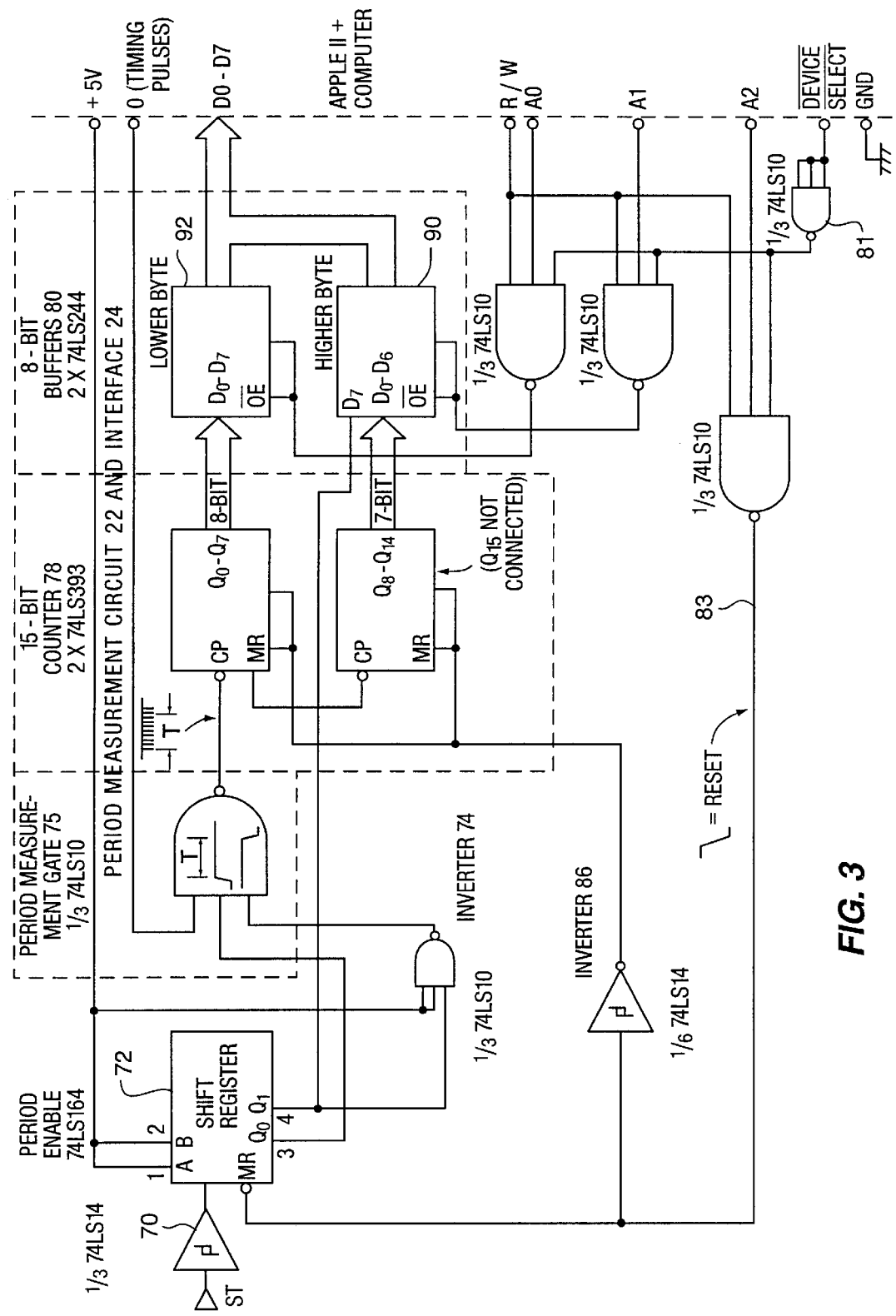
FIG. 3 is a circuit diagram of a period measurement circuit and other portions of the system shown in FIG. 1.

Referring now to FIG. 3, there is illustrated a preferred embodiment of the period measurement circuit 22 and the input/output interface 24 along with interconnections of same to the computer 26. The specific computer 26 is preferably APPLE II PLUS brand computer sold by Apple Computer, Inc., and the specific interconnections for that unit are shown.

The pulse train 16 is coupled through an operational amplifier 70 which serves as a Schmitt Trigger, to a shift register 72 whose outputs (pins 3 and 4) are coupled through an inverter 74 and period measurement gate 75 to a counter 78 which is coupled through buffers 80 to the computer 26.

Outputs from the computer 26, are taken from its R/W, A0, A1, A2 and $\overline{DS}$ (device select) outputs as well as from a source of bias (5 v.) and timing pulses and are supplied as shown in FIG. 3. Gates 81 and 82 serve to deliver the reset command over a line 83.

Figure 4:
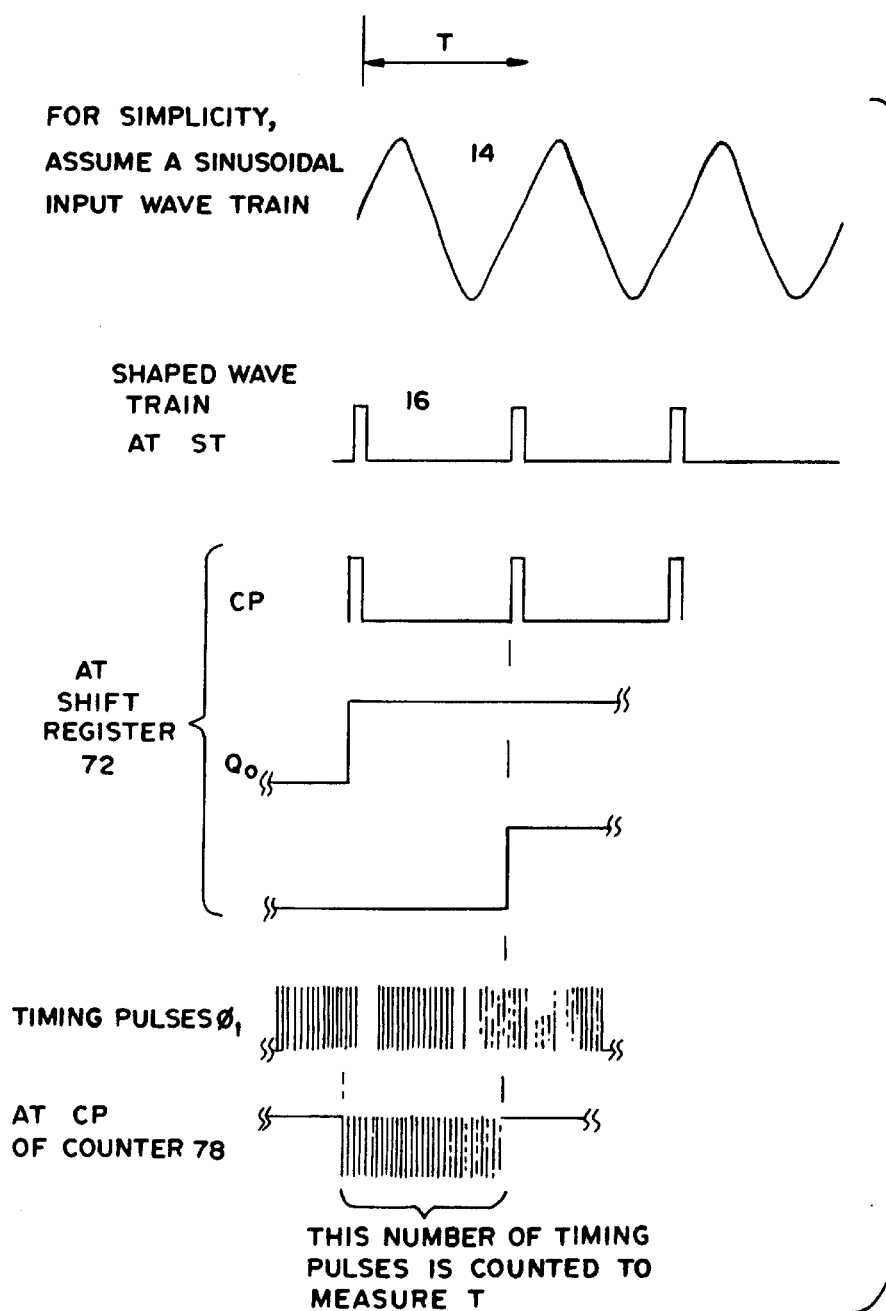
FIG. 4 is a set of wave forms useful in understanding the operation of the circuit of FIGS. 2 and 3.

The functioning of the circuitry of FIGS. 2–3 and computer 26 is better understood by reference to FIG. 4 which interrelates the waveforms 14, 16 and the inputs at CP to the shift register 72, the timing pulses from the computer 26 also delivered to a period measurement gate 75 as well as the output of the shift register 72 corresponding to the start and stop of the measured period "T".

In operation, the circuits of FIGS. 2 and 3 first reduce the input signal 14 to a pulse train 16 shaped so as to have one pulse per cycle at point ST (FIG. 2 and FIG. 3), the input to the Schmitt Trigger 70. The computer 26 resets the shift register 72 and Counter (over line 83 and through an inverter 86) and prepares the circuit for the next period measurement.

Upon arrival of a first rising edge of the shaped wave train 16 at CP of the shift register 72 its output Q0 goes from low to high (voltage levels). The counter 78 starts measuring the current period of the input wave train.

Upon the arrival of a second rising edge of the shaped wave train at input CP of the register 72, its output Q1 goes from low to high. The counter 78 stops counting. At the same instant, the input at the most significant digit of the higher byte buffer 90 of the buffers 80 is also set from low to high representing that the period measurement has been completed.

The computer 26 reads the higher byte buffer 90. If the most significant digit is high it is neglected and the computer 26 values the least significant 7 bits as Q8 to Q14 of a 15 bit binary number. (If the most significant digit is low that means period measurement is unfinished.) The computer 26 also reads the lower byte buffer 92, values the reading as the least significant 8 bits of the 15 bit binary number, that is Q0 to Q7. The computer 26 interprets the magnitude of this 15 bit binary number as the magnitude of the period just measured.

Figure 6:
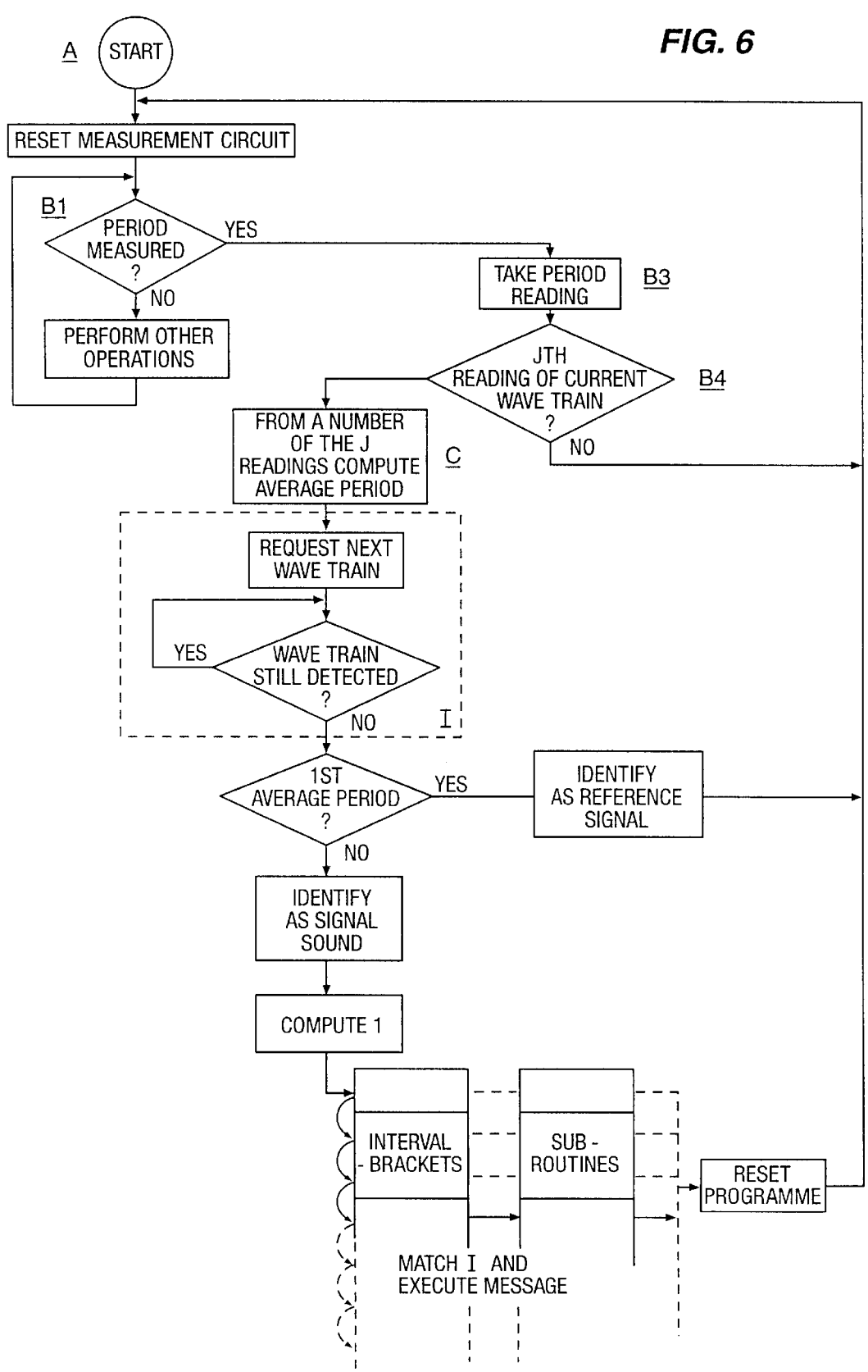
FIGS. 6, 7 and 8 are flow charts illustrating the operation of alternative embodiments of the system.

The operation of the system 10 can be further appreciated from the flow chart of FIG. 6. Here, the start sequence A feeds through a reset measurement circuit (gates 81–82 and their associated leads) for which it decides at B1 as to whether or not a periodic signal has been received. If not the system cycles back to await such a signal. If yes, it takes a reading at B3, and tests if the "Jth" (any number, e.g. 30th) re-occurrence of the same pulse period T in succession at stage B4. If no, it cycles back to reset measurement circuit. If yes, it computes an average period from the j readings at Stage C.

The flow chart of FIG. 6 is for single-interval measages. It is for isolated inputs of reference and signal wave trains wherein there is always a break between successive wave trains. The block I serves to detect these breaks.

If the output of block I is the first tonal signal detected it is treated as the reference signal and it is stored. If a second or successive signals are identified they are compared with the reference and an interval computed. The computed interval is attempted then to be matched, and if a match is found, the associated subroutine is executed and the program reset.

In practical use a computer terminal could display a menu such as the following:

| I AM AT YOUR SERVICE. 'SING' YOUR CHOICE | | |
|---|---|---|
| (DO DO) | FOR | (LIST PROGRAMME IN MEMORY) |
| (DO RE) | FOR | (DISPLAY PATTERN 'HO') |
| (DO ME) | FOR | (TEXT MODE DISPLAY) |
| (DO FA) | FOR | (FLASH MODE DISPLAY) |
| (DO SO) | FOR | (PLAY RUNNING TONES) |
| (DO LA) | FOR | (ACTIVATE EXTERNAL DRIVE TO CATALOG PROGRAMMES ON DISK) |
| (DO TE) | FOR | (DISPLAY 'TE') |
| (DO DO') | FOR | (ACTIVATE EXTERNAL DRIVE TO SAVE THIS PROGRAMME ON DISK, AND EXECUTE ANOTHER PROGRAMME ON DISK, AND RETURN) |

And the user need only "sing" the requested commands to activate the computer.

A suitable listing for use in the program of FIG. 6 is as follows:

-14-

```
5    REM       INVENTED BY HO KIT-FUN
8    REM       UNPUBLISHED COPYRIGHT
10   REM       P O BOX 54504
11   REM       NORTH POINT
12   REM       HONG KONG
15   REM
20   REM       1-INTERVAL
21   REM
23   REM       FIG. 6
25   REM
30   REM       ISOLATED INPUTS
32   REM
34   REM       32
40   REM
50   REM       SLOT 4
55   REM       J,W,K,I,I(K),N,X,P,I(P),M
     $
60   HN  =     128
62   NU  =     24: REM   SET "J" FOR EACH WAVE TRAIN
64   BY  =     256
69   I0  =     0.9688
70   I1  =     1.0625: REM  A BOUNDARY BETWEEN TWO
                       ADJACENT MUSICAL INTERVALS
71   I2  =     1.1875
73   I3  =     1.2975
74   I4  =     1.4167
75   I5  =     1.5833
76   I6  =     1.7708
77   I7  =     1.9444
78   I8  =     2.1250
82   GOTO      90
85   REM       HERE COMPUTER MAY BE PROGRAMMED TO
                  BRIEFLY PERFORM OTHER OPERATIONS
                  "UNRELATED" TO THIS PROGRAMME
88   GOTO      100
90   DIM       T(50), H(50), L(50)
91   W   =     0: GOTO 95: REM RESET PROGRAMME TO
                  ACCEPT A NEW REFERENCE
93   W   =     1: REM  RESET PROGRAMME TO ACCEPT
                  NEXT SIGNAL
95   J   =     1
96   FOR PS =  1 TO 2500: NEXT: HOME: PRINT
                  "I AM AT YOUR SERVICE. 'SING' YOUR
                  CHOICE": PRINT: PRINT "(DO DO) FOR
                  (LIST PROGRAMME IN MEMORY)": PRINT
                  "(DO RE) FOR (DISPLAY PATTERN 'HO')":
                  PRINT "(DO ME) FOR (TEXT MODE DISPLAY)"
97             PRINT "(DO FA) FOR (FLASH MODE DISPLAY)":
                  PRINT "(DO SO) FOR (PLAY RUNNING
                  TONES)": PRINT "(DO LA) FOR (ACTIVATE
                  EXTERNAL DRIVE)": HTAB 15: PRINT "TO
                  CATALOG PROGRAMMES ON": HTAB 15: PRINT
                  "DISK)": PRINT "(DO TE) FOR (DISPLAY
                  'TE')"
```

-15-

```
98      PRINT "(DO DO') FOR (ACTIVATE EXTERNAL
            DRIVE": HTAB 15: PRINT "TO SAVE
            THIS PROGRAMME": HTAB 15: PRINT
            "ON DISK, AND EXECUTE": HTAB 15:
            PRINT "ANOTHER PROGRAMME ON":
            HTAB 15: PRINT "DISK, AND RETURN)":
            REM MESSAGE FROM MACHINE
99 A    =   PEEK (49348): REM RESET MEASURING
            CIRCUIT
100 H(J) =  PEEK (49346): REM HIGH BYTE
140     IF  H(J) < HN THEN GO TO 85: REM PERIOD
            MEASUREMENT UNFINISHED
160 L(J) =  PEEK (49345): REM LOW BYTE
300 A    =  PEEK (49348): REM RESET MEASURING
            CIRCUIT
400     IF J  = NU THEN GO TO 2000
900     J  =  J + 1: GO TO 100
2000 W = W + 1: REM REFERENCE WAVE TRAIN IF W=1
2100    FOR J  = 5 TO 24:T(J) = (H(J) - HN)
            * BY + L(J): NEXT :J =1:
            REM PERIOD READINGS
2400    AVE(W) = 0.05 * (T(5) + T(6) + T(7)
            + T(8) + T(9) + T(10) + T(11)
            + T(12) + T(13) + T(14) + T(15)
            + T(16) + T(17) + T(18) + T(19)
            + T(20) + T(21) + T(22) + T(23)
            + T(24)): REM AVERAGE PERIOD
2420    PRINT CHR$ (7): REM BEEP FOR NEXT WAVE
            TRAIN
2466 A  =   PEEK (49348): REM RESET CIRCUIT AND
            TEST FOR SILENCE
2470    FOR PS = 1 to 20: NEXT:REM BRIEF PAUSE
2472    REM "WAVE TRAIN STILL DETECTED?"
2475 L   =  PEEK (49345):H = PEEK (49346)
2478    IF L = 0 AND H = 0 THEN GO TO 2495:
            REM "NO WAVE DETECTED"
2485    GO TO 2466
2495    REM "REFERENCE/SIGNAL BRANCHING"
2510    IF W = 1 THEN GO TO 100: REM IT WAS
            A REFERENCE WAVE
2520    REM IT WAS A SIGNAL WAVE TRAIN
2700 I  = AVE (1) / AVE (2): REM INTERVAL
            COMPUTED
2800    HOME: PRINT "INTERVAL = "; I
2810    IF I < I0 GOTO 91: REM SMALLER THAN THE
            LOWEST INTERVAL PROGRAMMED (WHICH
            MAY BE EXTENDED). START AGAIN
2820    IF I < I1 GO TO 3000: REM INTERVAL
            1.0000
2840    IF I < I2 GO TO 3500: REM INTERVAL
            1.1250
2860    IF I < I3 GO TO 4000: REM INTERVAL
            1.2500
2880    IF I < I4 GO TO 4500: REM INTERVAL
            1.3333
2900    IF I < I5 GO TO 5000: REM INTERVAL
            1.5000
```

-16-

```
2920  IF I <I6 GO TO 5500: REM INTERVAL
         1.6667
2940  IF I < I7 GO TO 6000: REM INTERVAL
         1.8750
2960  IF I < I8 GO TO 6500: REM INTERVAL
         2.0000
2980  GO TO 91: REM GREATER THAN THE HIGHEST
         INTERVAL PROGRAMMED (WHICH MAY BE
         EXTENDED).  START AGAIN
3000  REM MESSAGE IDENTIFIED WITH 1.0000
3005  REM  FEEDBACK
3010  FQ = 50: REM    *** DO *** OF AN
         ABITRARY MUSICAL SCALE
3020  GOSUB 9980
3030  IPRO = 1.0000:I$ = "DO"
3035  GOSUB 9800
3050  LIST
3499  GO TO 93
3500  REM  MESSAGE IDENTIFIED WITH 1.1250
3505  REM  FEEDBACK
3510  FQ = 76: REM   *** RE *** OF AN ABITRARY
         MUSICAL SCALE
3520  GOSUB 9980
3530  IPRO = 1.125:I$ = "RE"
3540  GOSUB 9800
3550  FLASH: PRINT "GRAPHIC": NORMAL
3600  GR
3610  COLOR=12
3650  VLIN 0,30 AT 2
3660  VLIN 0,30 AT 12
3670  HLIN 2,12 AT 15
3680  VLIN 0,30 AT 16
3690  VLIN 0,30 AT 26
3700  HLIN 16,26 AT 0
3720  HLIN 16,26 AT 30
3999  GO TO 93
4000  REM  MESSAGE IDENTIFIED WITH 1.2500
4005  REM  FEEDBACK
4010  FQ = 99: REM   *** ME *** OF AN ABITRARY
         MUSICAL SCALE
4020  GOSUB 9980
4040  IPRO = 1.2500:I$ = "ME"
4050  GOSUB 9800
4055  FLASH : PRINT "TEXT": NORMAL
4100  TEXT
4499  GO TO 93
4500  REM  MESSAGE IDENTIFIED WITH 1.3333
4502  REM  FEEDBACK
4505  FQ = 109: REM   *** FA *** OF AN ABITRARY
         MUSICAL SCALE
4510  GOSUB 9980
4515  IPRO = 1.3333:I$ = "FA"
4520  GOSUB 9800
4600  FLASH
4650  PRINT "FLASH"
4999  GO TO 93
```

-17-

```
5000  REM   MESSAGE IDENTIFIED WITH 1.5000
5001  REM   FEEDBACK
5002  FQ = 127: REM   *** SO *** OF AN
            ABITRARY MUSICAL SCALE
5004  GOSUB 9980
5010  IPRO = 1.5000:I$ = "SO"
5020  GOSUB 9800
5025  FLASH:  PRINT "MUSIC": NORMAL

5100  NORMAL
5105  TEXT
5120  FOR FQ = 230 TO 254
5160  GOSUB 5300
5180  NEXT FQ
5200  GO TO 93
5300  POKE 768,1
5320  POKE 769,FQ
5340  CALL 770
5350  RETURN
5500  REM   MESSAGE IDENTIFIED WITH 1.6667
5501  REM   FEEDBACK
5502  FQ = 144: REM   *** LA *** OF AN
            ABITRARY MUSICAL SCALE
5504  GOSUB 9980
5510  IPRO = 1.6667:I$ = "LA"
5520  GOSUB 9800
5522  PRINT
5523  HTAB 16
5525  FLASH: PRINT "LA": NORMAL

5550  PRINT CHR$ (4); "CATALOG"
5999  GO TO 93

6000  REM   MESSAGE IDENTIFIED WITH 1.8750
6005  REM   FEEDBACK
6010  FQ = 159: REM   *** TE *** OF AN
            ABITRARY MUSICAL SCALE
6015  GOSUB 9980
6020  IPRO = 1.8750:I$ = "TE"
6030  GOSUB 9800
6040  PRINT
6050  HTAB 16
6060  FLASH: PRINT "TE": NORMAL

6499  GO TO 93
6500  REM   MESSAGE IDENTIFIED WITH 2.0000
6505  REM   FEEDBACK
6510  FQ = 166: REM   *** DO' *** OF AN
            ABITRARY MUSICAL SCALE

6515  GOSUB 9980
6520  IPRO = 2.0000:I$ =  "DO'"
6530  GOSUB 9800
6540  PRINT
6550  HTAB 16
6560  FLASH: PRINT "DO'": NORMAL
```

```
            -18-
    6570  PRINT   CHR$ (4); "SAVE PROGRAMME"
    6580  PRINT   CHR$ (4); "BRUN BEEPING 350 20"
    6999  GO TO 93
    9800  PRINT "ERROR = "; (I - IPRO) / IPRO
    9810  PRINT
    9820  HTAB 2: PRINT "I RECOGNIZED INTERVAL
                (DO ";I$;") AND I AM NOW EXECUTING
                YOUR MESSAGE"
    9822  RETURN
    9980  REM   DECLARE THE RECOGNIZED INTERVAL
    9982  POKE 768,6: POKE 769,50: CALL 770:
                REM  A SOUND SUBROUTINE TO PRODUCE
                A PRESET REFERENCE SOUND FOR FEEDBACK
                PURPOSES
    9984  POKE 768,6: POKE 769,FQ: CALL 770: REM
                PRODUCE A SOUND BEARING THE
                RECOGNIZED INTERVAL
    9986  RETURN
    9990  END
```

In particular, system 10 will operate with a new reference for each command if line 93 of the above listings is modified as follows:

93 W=0

Such operation permits the same or a different speaker to freely change his or her reference from command to command.

Figure 7:
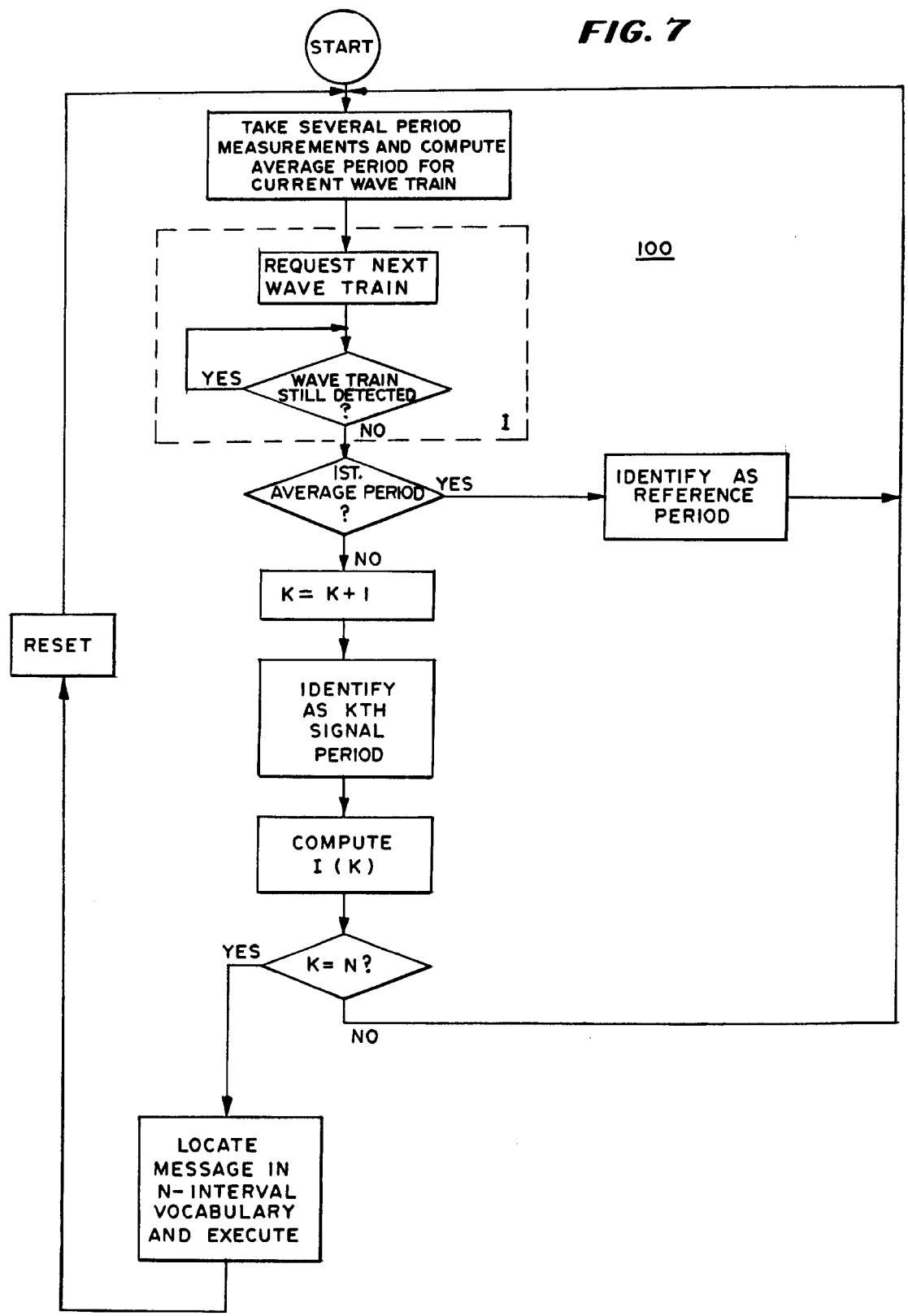

Referring now to FIG. 7 there is illustrated therein an alternative flow chart for the system of the present invention and is designated by reference numeral 100. This chart depicts the program for N-interval messages. That is, it is for a multi-tonal coding. E. g. where DO-RE-ME and DO-RE-FA are different signals.

A suitable listing for carrying out this program is as follows:

-18-

```
 5    REM    INVENTED BY HO, KIT-FUN
 8    REM    UNPUBLISHED COPYRIGHT
10    REM    P O BOX 54504
11    REM    NORTH POINT
12    REM    HONG KONG
15    REM
20    REM    N-INTERVAL
21    REM
22    N = 2
```

```
                        -19-
           23   REM        FIG. 7
           25   REM
           30   REM        ISOLATED INPUTS
           32   REM
           34   REM
           35   REM
           36   REM
           40   REM        9
           45   REM
           50   REM        SLOT 4
           55   REM        J,W,K,I,I(K),N,X,I(P),M$
           60   HN   =    128
           62   NU   =    24: REM   SET "J" FOR EACH WAVE TRAIN
           64   BY   =    256
           69   I0   =    0.9688: REM   LOWEST FOR THIS PROGRAMME.
                           MAY BE EXTENDED
           70   I1   =    1.0625: REM   A BOUNDARY BETWEEN TWO
                           ADJACENT MUSICAL INTERVALS
           71   I2   =    1.1875
           73   I3   =    1.2975
           74   I4   =    1.4167
           75   I5   =    1.5833
           76   I6   =    1.7708
           77   I7   =    1.9444
           78   I8   =    2.1250
           80   M$   =    "RECOGNIZED AND EXECUTING (MESSAGE)"
           82   GO TO 90
           85   REM      HERE COMPUTER MAY BE PROGRAMMED TO
                          BRIEFLY PERFORM OTHER OPERATIONS
                          "UNRELATED" TO THIS PROGRAMME
           88   GO TO 100
           90   DIM T(50), H(50), L(50)
           92   DIM K(100)
           95   J    =    1:W = 0:K = 0: REM   RESET PROGRAMME
           96   FOR PS = 1 TO 2500: NEXT: HOME: PRINT
                          "I AM AT YOUR SERVICE.  'SING'
                          YOUR 2-INTERVAL MESSAGE"
           97   PRINT: PRINT "EXAMPLE"
           98   PRINT "(DO RE SO) FOR (MESSAGE 25)":
                          PRINT "(DO FA DO) FOR (MESSAGE 41)"
           99   A = PEEK (49348): REM   RESET MEASURING CIRCUIT
          100   H(J) = PEEK (49346): REM   HIGH BYTE
          140   IF H(J) < HN THEN GO TO 85: REM   PERIOD
                          MEASUREMENT UNFINISHED
          160   L(J) = PEEK (49345): REM   LOW BYTE
          300   A = PEEK (49348): REM   RESET MEASURING
                          CIRCUIT
          400   IF J = NU THEN GO TO 2000
          900   J = J + 1: GO TO 100
         2000   W = W + 1: REM   "W"TH WAVE TRAIN
         2100   FOR J = 5 TO 24:T(J) = (H(J) - HN)
                          * BY +L(J): NEXT: J = 1: REM PERIOD
                          READINGS
         2400   AVE(W) = 0.05 * (T(5) + T(6) + T(7)
                          + T(8) + T(9) + T(10) + T(11)
                          + T(12) + T(13) + T(14) + T(15)
                          + T(16) + T(17) + T(18) + T(19)
                          + T(20) + T(21) + T(22) + T(23)
                          + T(24)): REM   AVERAGE PERIOD
```

-20-

```
2420  PRINT CHR$ (7): REM  BEEP FOR NEXT WAVE TRAIN
2466  A    = PEEK (49348): REM  RESET CIRCUIT AND
             TEST FOR SILENCE
2470  FOR PS = 1 TO 20: NEXT: REM  BRIEF PAUSE
2472  REM "WAVE TRAIN STILL DETECTED?"
2475  L = PEEK (49345): H = PEEK (49346)
2478  IF L = 0 AND H = 0 THEN GO TO 2495:
             REM "NO WAVE DETECTED"
2485  GO TO 2466
2495  REM "REFERENCE/SIGNAL BRANCHING"
2510  IF W = 1 THEN GO TO 100: REM  IT WAS A
             REFERENCE WAVE
2520  REM IT WAS A SIGNAL WAVE TRAIN
2550  K = K + 1: REM  "K"TH SIGNAL (NOTE THAT
             K=W-1)
2570  REM (AFTER A PROGRAMME RESET THE FIRST
             WAVE TRAIN IS TAKEN AS REFERENCE,
             ALL SUBSEQUENT WAVE TRAINS TAKEN
             AS SIGNALS REFERRED TO THIS
             REFERENCE, TILL THE NEXT RESET.)
2700  I(K) = AVE(1) / AVE(W): REM  INTERVAL
             COMPUTED
2720  PRINT "INTERVAL ="; I(K)
2740  IF K = N THEN GO TO 2770: REM AN N-INTERVAL
             MESSAGE
2760  GO TO 100
2770  REM LOCATE AND EXECUTE
2780  I = I(1): REM FIRST INTERVAL
2800  IF I < I0 GO TO 95: REM  TOO LOW FOR THIS
             PROGRAMME. START AGAIN
2820  IF I < I1 GO TO 21000: REM INTERVAL 1.0000
2840  IF I < I2 GO TO 22000: REM INTERVAL 1.1250
2860  IF I < I3 GO TO 23000: REM INTERVAL 1.2500
2880  IF I < I4 GO TO 24000: REM INTERVAL 1.3333
2900  IF I < I5 GO TO 25000: REM INTERVAL 1.5000
2980  GO TO 95: REM OUT OF PROGRAMMED RANGE.
             START AGAIN
21000 I = I(2): REM SECOND INTERVAL
21005 IF I < I0 GO TO 95: REM TOO LOW FOR THIS
             PROGRAMME. START AGAIN
21010 IF I < I1 GO TO 21100: REM INTERVAL 1.0000
21020 IF I < I2 GO TO 21200: REM INTERVAL 1.1250
21030 IF I< I3 GO TO 21300: REM INTERVAL 1.2500
21040 IF I < I4 GO TO 21400: REM INTERVAL 1.3333
21050 IF I < I5 GO TO 21500: REM INTERVAL 1.5000
21090 GO TO 95: REM OUT OF PROGRAMMED RANGE.
             START AGAIN
21100 PRINT M$; "11)"
21110 REM 'PROGRAMMED MESSAGE HERE'
21190 GO TO 95
21200 PRINT M$; "12)"
21210 REM 'PROGRAMMED MESSAGE HERE'
21290 GO TO 95
21300 PRINT M$; "13)"
21310 REM 'PROGRAMMED MESSAGE HERE'
21390 GO TO 95
```

-21-

```
21400 PRINT M$; "14)"
21410 REM 'PROGRAMMED MESSAGE HERE'
21490 GO TO 95
21500 PRINT M$; "15)"
21510 REM 'PROGRAMMED MESSAGE HERE'
21590 GO TO 95
22000 I = I(2): REM SECOND INTERVAL
22005 IF I   I0 GO TO 95: REM TOO LOW FOR THIS
            PROGRAMME.  START AGAIN
22010 IF I   I1 GO TO 22100: REM INTERVAL 1.0000
22020 IF I   I2 GO TO 22200: REM INTERVAL 1.1250
22030 IF I   I3 GO TO 22300: REM INTERVAL 1.2500
22040 IF I   I4 GO TO 22400: REM INTERVAL 1.3333
22050 IF I   I5 GO TO 22500: REM INTERVAL 1.5000
22090 GO TO 95: REM OUT OF PROGRAMMED RANGE.
            START AGAIN
22100 PRINT M$; "21)"
22110 REM 'PROGRAMMED MESSAGE HERE'
22190 GO TO 95
22200 PRINT M$; "22)"
22210 REM 'PROGRAMMED MESSAGE HERE'
22290 GO TO 95
22300 PRINT M$; "23)"
22310 REM 'PROGRAMMED MESSAGE HERE'
22390 GO TO 95
22400 PRINT M$; "24)"
22410 REM 'PROGRAMMED MESSAGE HERE'
22490 GO TO 95
22500 PRINT M$; "25)"
22510 REM 'PROGRAMMED MESSAGE HERE'
22590 GO TO 95
23000 I = I(2): REM SECOND INTERVAL
23005 IF I   I0 GO TO 95: REM TOO LOW FOR THIS
            PROGRAMME.  START AGAIN
23010 IF I  <I1 GO TO 23100: REM INTERVAL 1.0000
23020 IF I  <I2 GO TO 23200: REM INTERVAL 1.1250
23030 IF I  <I3 GO TO 23300: REM INTERVAL 1.2500
23040 IF I  <I4 GO TO 23400: REM INTERVAL 1.3333
23050 IF I  <I5 GO TO 23500: REM INTERVAL 1.5000
23090 GO TO 95: REM OUT OF PROGRAMMED RANGE.
            START AGAIN
23100 PRINT M$; "31)"
23110 REM 'PROGRAMMED MESSAGE HERE'
23190 GO TO 95
23200 PRINT M$; "32)"
23210 REM 'PROGRAMMED MESSAGE HERE'
23290 GO TO 95
23300 PRINT M$; "33)"
23310 REM 'PROGRAMMED MESSAGE HERE'
23390 GO TO 95
23400 PRINT M$; "34)"
23410 REM 'PROGRAMMED MESSAGE HERE'
23490 GO TO 95
23500 PRINT M$; "35)"
23510 REM 'PROGRAMMED MESSAGE HERE'
23590 GO TO 95
24000 I = I(2): REM SECOND INTERVAL
```

-22-

```
24005 IF I < I0 GO TO 95: REM INTERVAL TOO LOW
                FOR THIS PROGRAMME.  START AGAIN
24010 IF I < I1 GO TO 24100: REM INTERVAL 1.0000
24020 IF I < I2 GO TO 24200: REM INTERVAL 1.1250
24030 IF I < I3 GO TO 24300: REM INTERVAL 1.2500
24040 IF I < I4 GO TO 24400: REM INTERVAL 1.3333
24050 IF I < I5 GO TO 24500: REM INTERVAL 1.5000
24090 GO TO 95: REM OUT OF PROGRAMMED RANGE.
                START AGAIN
24100 PRINT M$; "41)"
24110 REM 'PROGRAMMED MESSAGE HERE'
24190 GO TO 95
24200 PRINT M$; "42)"
24210 REM 'PROGRAMMED MESSAGE HERE'
24290 GO TO 95
24300 PRINT M$; "43)"
24310 REM 'PROGRAMMED MESSAGE HERE'
24390 GO TO 95
24400 PRINT M$; "44)"
24410 REM 'PROGRAMMED MESSAGE HERE'
24490 GO TO 95
24500 PRINT M$; "45)"
24510 REM 'PROGRAMMED MESSAGE HERE'
24590 GO TO 95
25000 I = I(2): REM SECOND INTERVAL
25005 IF I < I0 GO TO 95: REM TOO LOW FOR THIS
                PROGRAMME.  START AGAIN
25010 IF I < I1 GO TO 25100: REM INTERVAL 1.0000
25020 IF I < I2 GO TO 25200: REM INTERVAL 1.1250
25030 IF I < I3 GO TO 25300: REM INTERVAL 1.2500
25040 IF I < I4 GO TO 25400: REM INTERVAL 1.3333
25050 IF I < I5 GO TO 25500: REM INTERVAL 1.5000
25090 GO TO 95: REM OUT OF PROGRAMMED RANGE.
                START AGAIN
25100 PRINT M$; "51)"
25110 REM 'PROGRAMMED MESSAGE HERE'
25190 GO TO 95
25200 PRINT M$; "52)"
25210 REM 'PROGRAMMED MESSAGE HERE'
25290 GO TO 95
25300 PRINT M$; "53)"
25310 REM 'PROGRAMMED MESSAGE HERE'
25390 GO TO 95
25400 PRINT M$; "54)"
25410 REM 'PROGRAMMED MESSAGE HERE'
25490 GO TO 95
25500 PRINT M$; "55)"
25510 REM 'PROGRAMMED MESSAGE HERE'
25590 GO TO 95
```

Figure 8:
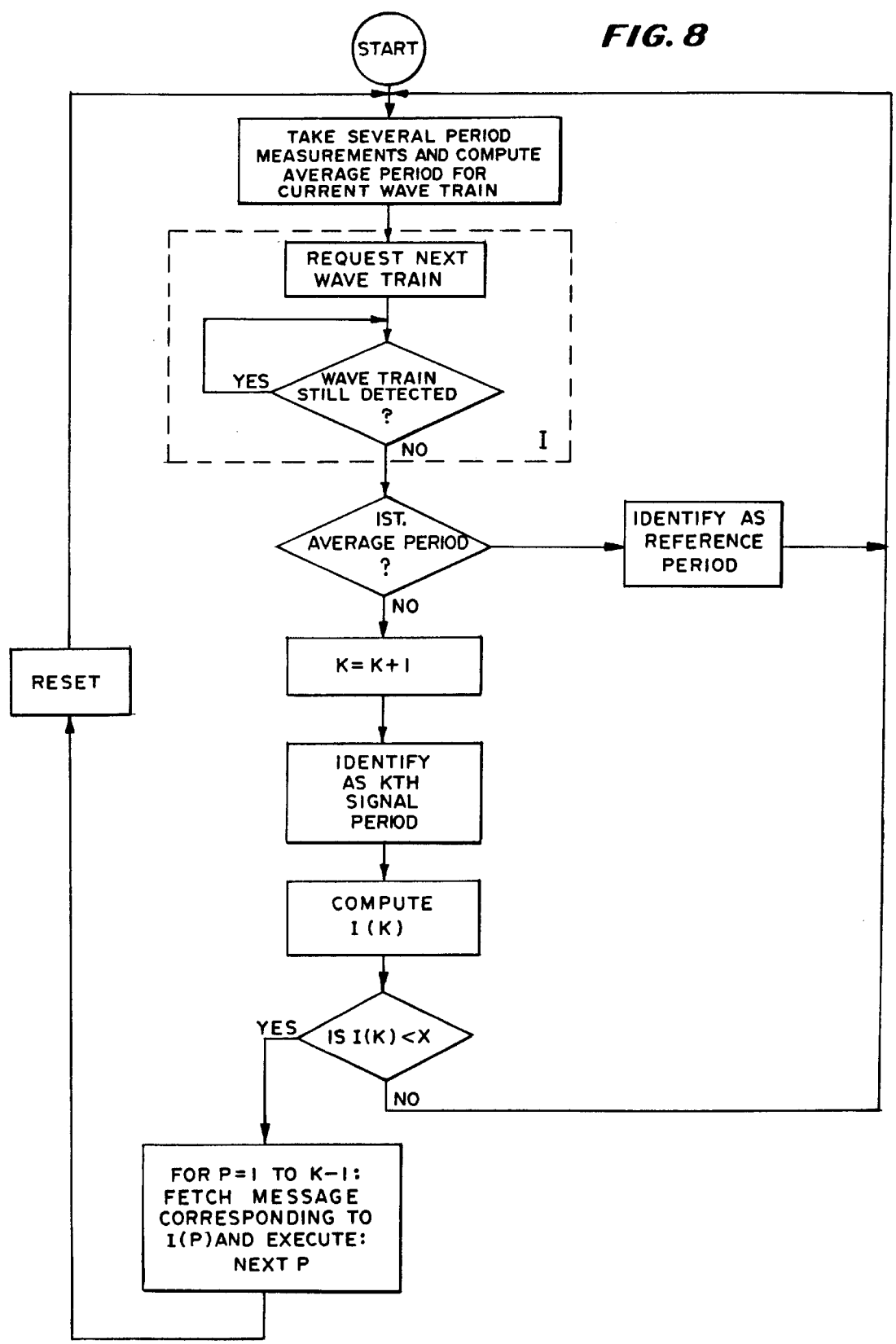

A further alternative flow chart for an oral program is shown in FIG. 8. By inputing a sequence of sounds the speaker effectively defines an oral program (e.g. a process) consisting of a desired sequence of vocal commands for subsequent execution.

A suitable listing for carrying out this program in accordance with the flow chart of FIG. 8 is set forth below:

```
5    REM INVENTED BY HO FIT-FUN
8    REM UNPUBLISHED COPYRIGHT
10   REM P O BOX 54504
11   REM NORTH POINT
12   REM HONG KONG
15   REM
20   REM 1-INTERVAL
21   REM
23   REM FIG. 8
25   REM PROGRAMMING USING VOCAL COMMANDS
30   REM ISOLATED INPUTS
32   REM
34   REM 'ONE REFERENCE FOR EACH ORAL PROGRAMME'
36   REM
40   REM VOPRO 18
45   REM
50   REM SLOT 4
55   REM J,W,K,I,I(K),N,X,I(P),M$
60   HN = 128
62   NU = 24: REM SET "J" FOR EACH WAVE TRAIN
64   BY = 256
69   I0 = 0.9688: REM  LOWEST IN THIS PROGRAMME.
             MAY BE EXTENDED

70   I1 = 1.0625: REM  A BOUNDARY BETWEEN TWO
             ADJACENT MUSICAL INTERVALS
71   I2 = 1.1875
73   I3 = 1.2975
74   I4 = 1.4167
75   I5 = 1.5833
76   I6 = 1.7708
77   I7 = 1.9444
78   I8 = 2.1250
82   GO TO 90
85   REM HERE COMPUTER MAY BE PROGRAMMED TO
             BRIEFLY PERFORM OTHER OPERATIONS
             "UNRELATED" TO THIS PROGRAMME
88   GO TO 100
90   DIM T(50), H(50), L(50)
92   DIM K(100)
95 J = 1:W = 0:K = 0: REM   RESET PROGRAMME
96   FOR PS = 1 TO 2500: NEXT: HOME: PRINT
             "I AM AT YOUR SERVICE. 'SING' YOUR
             CHOICE": PRINT: PRINT "(DO DO)
             FOR (LIST PROGRAMME IN MEMORY)":
             PRINT "(DO RE) FOR (DISPLAY PATTERN
             'HO')":PRINT "(DO ME) FOR (TEXT MODE
             DISPLAY)"
```

-24-

```
97    PRINT "(DO FA) FOR (FLASH MODE DISPLAY)":
         PRINT "(DO SO) FOR (PLAY RUNNING TONES)":
         PRINT "(DO LA) FOR (ACTIVATE EXTERNAL
         DRIVE": HTAB 15: PRINT "TO CATALOG
         PROGRAMMES ON": HTAB 15: PRINT "DISK)":
         PRINT "(DO TE) FOR (DISPLAY 'TE')"
98    PRINT "(DO DO') FOR (ACTIVATE EXTERNAL
         DRIVE": HTAB 15: PRINT "TO SAVE THIS
         PROGRAMME": HTAB 15: PRINT "ON DISK,
         AND EXECUTE": HTAB 15: PRINT "ANOTHER
         PROGRAMME ON": HTAB 15: PRINT "DISK,
         AND RETURN)": REM MESSAGE FROM MACHINE

99 A  =   PEEK (49348): REM   RESET MEASURING CIRCUIT
100  H(J) = PEEK (49346): REM HIGH BYTE
140   IF H(J) < HN THEN GO TO 85: REM PERIOD
         MEASUREMENT UNFINISHED
160   L(J) = PEEK (49345): REM LOW BYTE
300 A = PEEK (49348): REM   RESET MEASURING
         CIRCUIT
400   IF J = NU THEN GO TO 2000
900  J = J + 1: GO TO 100
2000 W = W + 1: REM "W"TH WAVE TRAIN
2100  FOR J = 5 TO 24:T(J) = (H(J) - HN)
         * BY + L(J): NEXT: J = 1:
         REM PERIOD READINGS
2400 AVE(W) = 0.05 * (T(5) + T(6) + T(7) + T(8)
         + T(9)  + T(10) + T(11) + T(12)
         + T(13) + T(14) + T(15) + T(16)
         + T(17) + T(18) + T(19) + T(20)
         + T(21) + T(22) + T(23) + T(24)):
         REM   AVERAGE PERIOD
2420  PRINT CHR$ (7): REM   BEEP FOR NEXT WAVE TRAIN
2466 A = PEEK (49348): REM   RESET CIRCUIT AND TEXT
         FOR SILENCE
2470  FOR PS = 1 TO 20: NEXT: REM   BRIEF PAUSE
2472  REM "WAVE TRAIN STILL DETECTED?"
2475  L = PEEK (49345): H = PEEK (49346)
2478 IF L = 0 AND H = 0 THEN GO TO 2495:
         REM   "NO WAVE DETECTED"

2485  GO TO 2466
2495  REM "REFERENCE/SIGNAL BRANCHING"
2510  IF W = 1 THEN GO TO 100: REM IT WAS A
         REFERENCE WAVE
2520  REM IT WAS A SIGNAL WAVE TRAIN
2550  K = K + 1: REM "K"TH SIGNAL (NOTE THAT
         K=W-1)
2570  REM (AFTER A PROGRAMME RESET THE FIRST
         WAVE TRAIN IS TAKEN AS THE REFERENCE.
         ALL SUBSEQUENT WAVE TRAINS TAKEN AS
         SIGNALS REFERRED TO THIS REFERENCE,
         TILL THE NEXT RESET.)
```

-25-

```
2700  I(K) = AVE (1) / AVE (W): REM INTERVAL
            COMPUTED
2720  PRINT "INTERVAL ="; I(K)
2740  IF I(K) < 0.9688 GO TO 2770: REM  A PRESET
            VALUE OF X (SEE FLOW CHART FIG 8)
            WHICH IS PROGRAMMABLE
2760  GO TO 100
2770  REM EXECUTE ORAL PROGRAMME JUST ENTERED
2780  FOR P = 1 TO K = 1: I = I(P): GOSUB 2790: NEXT
2785  GO TO 95
2790  REM 'BUILDING BLOCKS OF A PROGRAMMABLE
            PROCESS'
2800  IF I < I0 GO TO 95: REM TOO LOW FOR THE
            PROGRAMMED RANGE HERE.  START AGAIN
2820  IF I < I1 GO TO 3000: REM INTERVAL 1.0000
2840  IF I < I2 GO TO 3500: REM INTERVAL 1.1250
2860  IF I < I3 GO TO 4000: REM INTERVAL 1.2500
2880  IF I < I4 GO TO 4500: REM INTERVAL 1.3333
2900  IF I < I5 GO TO 5000: REM INTERVAL 1.5000
2920  IF I < I6 GO TO 5500: REM INTERVAL 1.6667
2940  IF I < I7 GO TO 6000: REM INTERVAL 1.8750
2960  IF I < I8 GO TO 6500: REM INTERVAL 2.0000
2980  RETURN: REM GREATER THAN THE HIGHEST INTERVAL
            PROGRAMMED (WHICH MAY BE EXTENDED).
            NEGLECT
3000  REM MESSAGE IDENTIFIED WITH 1.0000
3005  REM FEEDBACK
3010  FQ = 50: REM *** DO *** OF AN ABITRARY
            MUSICAL SCALE
3020  GOSUB 9980
3030  IPRO = 1.0000:I$ = "DO"
3035  GOSUB 9800
3050  LIST
3499  RETURN
3500  REM MESSAGE IDENTIFIED WITH 1.1250
3505  REM FEEDBACK
3510  FQ = 76: REM *** RE *** OF AN ABITRARY
            MUSICAL SCALE
3520  GOSUB 9980
3530  IPRO = 1.124:I$ = "RE"
3540  GOSUB 9800
3550  FLASH: PRINT "GRAPHIC": NORMAL
3600  GR
3610  COLOR= 12
3650  VLIN 0,30 AT 2
3660  VLIN 0,30 AT 12
3670  VLIN 2,12 AT 15
3680  VLIN 0,30 AT 16
3690  VLIN 0,30 AT 26
3700  HLIN 16,26 AT 0
3720  HLIN 16,26 AT 30
3999  RETURN
4000  REM MESSAGE IDENTIFIED WITH 1.2500
4005  REM FEEDBACK
4010  FQ= 99: REM *** ME *** OF AN ABITRARY
            MUSICAL SCALE
4020  GOSUB 9980
```

```
-26-
4040    IPRO = 1.2500:I$ = "ME"
4050    GOSUB 9800
4055    FLASH: PRINT "TEXT": NORMAL

4100    TEXT
4499    RETURN
4500    REM  MESSAGE IDENTIFIED WITH 1.3333
4502    REM FEEDBACK
4505    FQ = 109: REM *** FA *** OF AN ABITRARY
            MUSICAL SCALE
4510    GOSUB 9980
4515    IPRO = 1.3333:I$ = "FA"
4520    GOSUB 9800
4600    FLASH
4650    PRINT "FLASH"
4999    RETURN
5000    REM  MESSAGE IDENTIFIED WITH 1.5000
5001    REM FEEDBACK
5002    FQ = 127: REM *** SO *** OF AN ABITRARY
            MUSICAL SCALE
5004    GOSUB 9980
5010    IPRO = 1.5000:I$ = "SO"
5020    GOSUB 9800
5025    FLASH: PRINT "MUSIC"

5100    NORMAL
5105    TEXT
5120    FOR FQ = 230 TO 254
5160    GOSUB 5300
5180    NEXT FQ
5200    RETURN
5300    POKE 768,1
5320    POKE 769,FQ
5340    CALL 770
5350    RETURN
5500    REM  MESSAGE IDENTIFIED WITH 1.6667
5501    REM FEEDBACK
5502    FQ = 144: REM *** LA *** OF AN ABITRARY
            MUSICAL SCALE
5504    GOSUB 9980
5510    IPRO = 1.6667:I$ = "LA"
5520    GOSUB 9800
5522    PRINT
5523    HTAB 16
5525    FLASH: PRINT "LA": NORMAL

5550    PRINT CHR$ (4); "CATALOG"
5999    RETURN
6000    REM  MESSAGE IDENTIFIED WITH 1.8750
6005    REM  FEEDBACK
6010    FQ = 159: REM *** TE *** OF AN ABITRARY
            MUSICAL SCALE
6015    GOSUB 9980
6020    IPRO = 1.8750:I$ = "TE"
6030    GOSUB 9800
6040    PRINT
6050    HTAB 16
6060    FLASH: PRINT "TE": NORMAL
```

```
-27-

6499  RETURN
6500  REM   MESSAGE IDENTIFIED WITH 2.0000
6505  REM FEEDBACK
6510  FQ = 166: REM **** DO' *** OF AN ABITRARY
            MUSICAL SCALE

6515  GOSUB 9980
6520  IPRO = 2.0000:I$ = "DO'"
6530  GOSUB 9800
6540  PRINT
6550  HTAB 16
6560  FLASH:PRINT "DO'": NORMAL

6570  PRINT CHR$ (4); "SAVE PROGRAMME"
6580  PRINT CHR$ (4); "BRUN BEEPING 350 20"
6999  RETURN
9800  PRINT "ERROR = ";(I - IPRO) / IPRO
9810  PRINT
9820  HTAB 2: PRINT "I RECOGNIZED INTERVAL
            (DO ";I$;") AND I AM NOW EXECUTING
            YOUR MESSAGE"
9822  RETURN
9980  REM DECLARE THE RECOGNIZED INTERVAL
9982  POKE 768,6: POKE 769,50: CALL 700:
            REM A SOUND SUBROUTINE TO PRODUCE
            A PRESET REFERENCE SOUND
9984  POKE 768,6: POKE 769,FQ: CALL 770: REM
            PRODUCE A SECOND SOUND BEARING THE
            RECOGNIZED INTERVAL
9986  RETURN
9990  END
```

Figure 9:
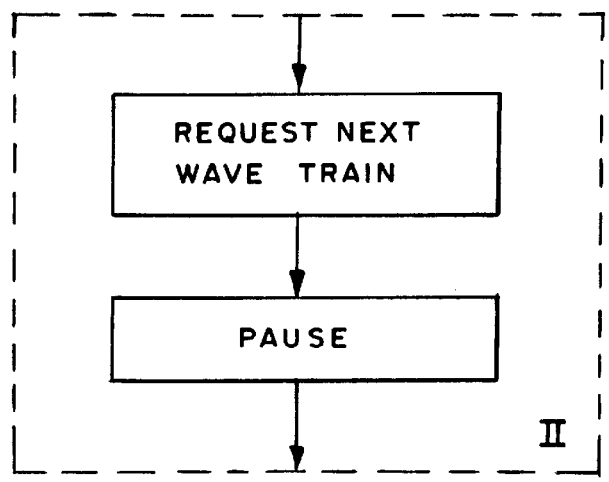
FIGS. 9 and 10 are alternative flow chart sub-routines that may be substituted for a portion of each of the flow charts shown in FIGS. 6, 7 or 8.

FIG. 9 illustrates an alternative subroute, labeled II, which can be substituted for the flow diagram block labeled I in FIGS. 6, 7 and 8 and which allows the system to handle slurred inputs, i.e. slurred wave trains, when substituted for any of the blocks I in FIGS. 6, 7 and 8. Such operation is advantageous to a human speaker as less effort is required in producing slurred vocal sounds than isolated ones.

A suitable listing for implementing the program of block II is:

2420 PRINT CHR$ (7): REM BEEP FOR NEXT WAVE TRAIN 2460 for PS=1 TO 500: NEXT: REM PAUSE This may be used, e.g. in place of lines 2420–2485 of the program listing for the flow chart of FIG. 6 listed above. It should be noted that the pause of FIG. 9 should be long enough to prevent the current wave train (of the flow charts of FIGS. 6, 7 and 8) being mistaken for a followon reading, i.e. mistaken for a "next wave train" and the user should take care not to continue to produce such a wave train for longer than the pause.

Figure 10:
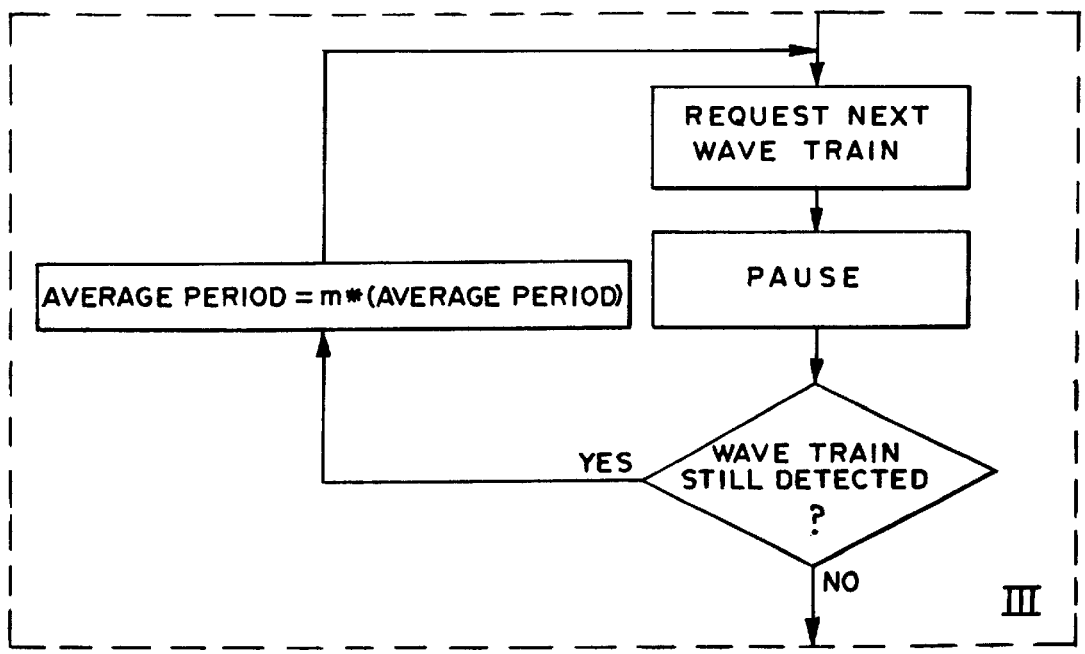

FIG. 10 illustrates another alternative subroute labeled III. The flow diagram block labeled III, modifies the system 10 to allow the user to in effect extend his or her frequency range by producing and holding a wave train output for longer than normally required. That is, for longer than the pause period. When the machine detects a wave train lasting longer than a pre-determined duration it modifies the data by a scaling factor to get a virtual interval before message identification (i.e. before interpretation).

The term m in block III of FIG. 10, is a scaling factor which may take any particular value in a range. Two particular values, 0.5 and 2 are especially useful for the human speaker. When m=0.5, the machine listener performs upper octave transposition and when m=2, lower octave transposition. (I.e. DO-RE, interval 1.125, if m=0.5 and if the RE is held, measures interval 2.5 or DO-RE'). Repeated transpositions are realized when the speaker or singer further maintains the wave train. This means that the frequency range of the speaker is virtually extended. Also, verbal inputs permit the user to operate within a comfortable frequency range and yet achieve a large number of intervals as if he or she had a much wider voice frequency range. Thus a greater umber of different "word" signals may be given using only few notes.

A suitable listing for the program in block III of IG. 10 is as follows:

```
2420    PRINT CHR$ (7): REM BEEP FOR NEXT WAVE TRAIN
2464    FOR PS = 1 TO 1000: NEXT: REM PAUSE
2466    A = PEEK (49348) : REM RESET CIRCUIT AND
        TEST FOR SILENCE
2470    FOR PS = 1 TO 100: NEXT: REM BRIEF PAUSE
2472    REM "WAVE TRAIN STILL DETECTED?"
2475    L = PEEK (49345) :H = PEEK (49346)
2478    IF L = 0 AND H = 0 THEN GO TO 2495:
        REM NO WAVE DETECTED
2480    AVE(W) = AVE (W) /2: REM MULTIPLYING
        FACTOR = 1/2
2485    GO TO 2420
```

From the foregoing description it will be apparent that the present invention teaches a novel system for communication with a computer. The system uses the concept of communication by a musical interval code and this substantially extends the number and ease of recognition of oral commands.

The system is economical and efficient to implement and easily learned and effectively used. It is not user specific and yet provides for a large number of "words" (intervals) to be recognized while being economical to construct and use.

While several embodiments of the system of the present invention have been shown and described, it will be understood by those skilled in the art that changes and modifications may be made to the system 10, 100 or modifications thereto described herein without departing from the teachings of the present invention. Accordingly, the scope of the present invention is only to be limited as necessitated by the accompanying claims.

I claim:

1. A system for communication, by means of verbal inputs from human speakers tolerant of more than two zero crossings per repetitive period in the wave pattern of the speaker's voice and of the pitch range of the speaker's voice, with a computer having a series of subroutines prerecorded therein in association with different predetermined tonal intervals, comprising:

(a) means including a transducer and a wave shaping circuit comprising an amplifying and low pass filtering circuit having an input and an output, said input being coupled to said transducer, and a comparator having an input and an output, said comparator input being coupled to said amplifying and low pass filtering circuit for converting a verbal input having a repetitive period into a signal representative of the repetitive period of said verbal input of a conversion resolution exceeding twelve musical notes per octave;

(b) means including a period measurement means coupled to said verbal input converting means for calculating the interval between a signal representative of the repetitive period of a received verbal input and a variable reference tonal signal; and (c) means in said computer responsive to said converting and calculating means for selecting and running a prerecorded subroutine associated with the particular interval calculated by said interval calculating means.

2. The system of claim 1 being constructed and arranged to respond to a reference signal established by a verbal input into said converting means.

3. The system of claim 2 being operable to respond to said calculated intervals comprising musical intervals.

4. The system of claim 2 being operable to respond to intervals of approximately 1.000, 1.125, and 1.250.

5. The system of claim 1 being operable to respond to verbal input commands, said reference tonal signal being a signal separate from said commands, whereby communication may be achieved with commands carrying no reference signal.

6. The system of claim 1 being constructed and arranged to respond to a plurality of verbal commands, each of said plurality of verbal command consisting of a single utterance of one tone.

7. The system of claim 1 being constructed and arranged to respond to a received verbal input which has a time duration within a predetermined range by regarding said received verbal input as a virtual verbal input having a differing repetitive frequency.

8. The system of claim 1 being constructed and arranged to have a plurality of different responses with the same specific interval if a predetermined timing condition is met.

9. The system of claim 1 being constructed and arranged to store a program sequence defined by a sequence of verbal input commands.

10. A verbally actuated computer control apparatus for receiving and recognizing a plurality of verbal commands from speakers tolerant of more than two zero crossings per repetitive period in the wave pattern of the speaker's voice and of the pitch range of the speakers voice, comprising:

means including a transducer and a wave shaping circuit comprising an amplifying and low pass filtering circuit having an input and an output, said input being coupled to said transducer and a comparator having an input and an output, said comparator input being coupled to said amplifying and low pass filtering circuit for converting the electrical analog or verbal sounds into a pulse train at the repetitive period of said verbal sounds at a conversion resolution exceeding twelve musical notes per octave;

means coupled to said converting means for measuring the period of said pulse train and for comparing the period of said pulse train with a variable reference period;

means in said computer for calculating the interval between the period of said pulse train and said reference period; and means responsive to said calculating means for causing the computer to execute different routines in response to selected calculated different specific interval values.

11. A human utterance recognition system tolerant of more than two zero crossing per repetitive period, comprising means for responding to verbal commands having a repetitive frequency, said verbal commands being related by specific musical frequency intervals, and means for recognizing and associating a number of specific different commands with a like number of different specific musical intervals, said means for responding and said means for recognizing and associating including a transducer, a wave shaping circuit comprising an amplifying and low pass filtering circuit having an input and an output, said input being coupled to said transducer, and a comparator having an input and an output, said comparator input being coupled to said amplifying and low pass filtering circuit, and said comparator output having a resolution exceeding twelve musical notes per octave being coupled to a computer, said computer being operable to select and run a prerecorded subroutine associated with the specific musical frequency intervals identified by the comparator output.

12. The system of claim 11 wherein said means are operable with utterance commands each comprising a series of continuously uttered verbal inputs.

13. The system of claim 11 further comprising means for feeding back audible tones to acknowledge the input of said utterance commands.

14. The system of claim 11 further comprising means for feeding back audible tones resembling the intervals of a recognized verbal command, whereby correct recognition may be heard with cognizable tones.

15. A human utterance recognition system comprising:

said human utterance recognition system being tolerant of more than two zero crossings per repetitive period in the wave pattern of the speaker's voice and of the pitch range of the speaker's voice;

a waveform conversion circuit including a transducer and a wave shaping circuit comprising an amplifying and low pass filtering circuit having an input and an output, said input being coupled to said transducer and a comparator having an input and an output, said comparator input being coupled to respond to a verbal input having a repetitive period to produce at a resolution exceeding twelve musical notes per octave a pulse train of the same repetitive period as said verbal input;

a period measurement and comparison circuit for receiving and measuring the pulse train output of said wave conversion circuit including means for comparing the pulse train period of said verbal input with a variable reference period and means including a computer for calculating the frequency interval thereof; and means coupled to said calculating means for only responding to specific intervals.

16. A method for verbal communication with a computer through interfacing circuitry including a transducer, a wave shaping circuit comprising an amplifying and low pass filtering circuit having an input and an output, said input being coupled to said transducer, and a comparator having an input and an output, said comparator input being coupled to said amplifying and low pass filtering circuit, said comparator output having a resolution exceeding twelve musical notes per octave comprising the steps of:

presenting verbal inputs to the interfacing circuitry in the form of verbal inputs having a repetitive frequency;

recognizing a plurality of the verbal inputs from human speakers tolerant of more than two zero crossings per repetitive period in the wave pattern of the speaker's voice and of the pitch range of the speaker's voice;

calculating in the computer the interval of the repetitive frequency of a received verbal signal to the frequency of a variable reference tone; and selecting and running in the computer a prerecorded subroutine protocol associated with the particular interval calculated.

17. The method of claim 16 wherein said verbal inputs conform to musical intervals.

18. The method of claim 16 being operable to respond to intervals of approximately 1.000, 1.125, and 1.250.

19. The method of claim 16 wherein said subroutine is an alternative subroutine selected upon a predetermined timing condition.

20. The method of claim 16 further comprising, before the calculating step, the step of:

deriving from each of said verbal inputs a signal related to the repetitive frequency thereof.

21. The method of claim 20 wherein said deriving step comprises the step of:

converting each verbal input having a repetitive frequency into a pulse train having the same repetitive frequency.

22. The method of claim 16 wherein said interval calculation step further comprises the step of using a pre-established reference tonal signal.

23. A voice message recognition system for receiving and recognizing a plurality of verbal commands from human speakers tolerant of more than two zero crossings per repetitive period in the wave pattern of the speaker's voice and of the pitch range of the speaker's voice comprising:

(a) means including a transducer and a wave shaping circuit for receiving and shaping an input wave train of voice commands;

(b) means including a period measurement circuit for receiving said shaped input wave train and relating the verbal commands to specific musical intervals;

(c) a computer;

(d) means for interfacing said period measurement circuit with said computer;

(e) said system being constructed and arranged to recognize and associate a number of specific different verbal commands with a like number of different specific musical frequency intervals and, (f) said wave shaping circuit comprising: an amplifying and low pass filtering circuit having an input and an output, said input being coupled to said transducer, and a comparator having an input and an output, said comparator input being coupled to said amplifying and low pass filtering circuit, said comparator output having a resolution exceeding twelve musical notes per octave.

24. The system of claim 23 wherein said period measurement circuit and said means for interfacing with said computer comprise: a Schmitt Trigger coupled to the output of said wave shaping circuit; a period enable circuit including a shift register having a first, $Q_0$, output at an output pin 3 thereof and a second output, $Q_1$, (the inversion of the first output, $Q_0$) at a second output pin 4 thereof coupled to an output of said Schmitt Trigger; a period measurement gate circuit including a NAND gate coupled to the pin 3 output of said shift register; a counter circuit; the output of said NAND gate being coupled to said counter circuit; said period enable circuit including a second NAND gate coupled between the pin 4 output of said shift register and said first NAND gate; an inverter coupled between the MR terminal of said shift register and said counter circuit; and buffer circuit means including a low byte buffer and a high byte buffer coupled between said counter circuit and said computer.

\* \* \* \* \*